US012670623B2

(12) United States Patent
Mukherjee et al.

(10) Patent No.: US 12,670,623 B2
(45) Date of Patent: Jun. 30, 2026

(54) SYSTEMS AND METHODS FOR AUTOMATIC CAMERA CALIBRATION

(71) Applicant: Harman Connected Services, Inc., Mountain View, CA (US)

(72) Inventors: Somnath Mukherjee, Bangalore (IN); Dariusz Jerzy Rzeszotarski, Lodz (PL); Greg Bohl, Muenster, TX (US)

(73) Assignee: HARMAN CONNECTED SERVICES, INC., Mountain View, CA (US)

( * ) Notice: Subject to any disclaimer, the term of this patent is extended or adjusted under 35 U.S.C. 154(b) by 0 days.

(21) Appl. No.: 18/713,138

(22) PCT Filed: Jan. 26, 2022

(86) PCT No.: PCT/US2022/070361
§ 371 (c)(1),
(2) Date: May 23, 2024

(87) PCT Pub. No.: WO2023/097125
PCT Pub. Date: Jun. 1, 2023

(65) Prior Publication Data
US 2025/0037311 A1 Jan. 30, 2025

(30) Foreign Application Priority Data
Nov. 24, 2021 (IN) .............................. 202141054119

(51) Int. Cl.
*G06T 7/60* (2017.01)
*B60W 50/14* (2020.01)
(Continued)

(52) U.S. Cl.
CPC ............... *G06T 7/80* (2017.01); *B60W 50/14* (2013.01); *G06T 7/60* (2013.01); *G06V 10/25* (2022.01);
(Continued)

(58) Field of Classification Search
None
See application file for complete search history.

(56) References Cited

U.S. PATENT DOCUMENTS 11,037,002 B2 6/2021 Kompalli et al.
2018/0012085 A1* 1/2018 Blayvas .............. G06F 18/2414
(Continued)

FOREIGN PATENT DOCUMENTS

CN 112949448 A 6/2021
EP 3273408 A1* 1/2018 ......... G06K 9/00805

OTHER PUBLICATIONS

ISA European Patent Office, International Search Report and Written Opinion Issued in Application No. PCT/US2022/070361, Aug. 19, 2022, WIPO, 61 pages.

*Primary Examiner* — Samuel D Fereja
(74) *Attorney, Agent, or Firm* — McCoy Russell LLP

(57) ABSTRACT

Methods and systems are provided for calibrating an on-board camera of a vehicle by detecting one or both of a lead vehicle geometry and a road lane width. In one example, a method includes identifying a known vehicle geometry of a lead vehicle; estimating a distance to the lead vehicle based on matching the known vehicle geometry to an image of the known vehicle geometry from the camera; and updating a calibration of the camera based on the estimated distance.

15 Claims, 9 Drawing Sheets

(51) Int. Cl.
  G06T 7/80   (2017.01)
  G06V 10/25   (2022.01)
  G06V 10/82   (2022.01)
  G06V 20/58   (2022.01)

(52) U.S. Cl.
  CPC .............. *G06V 10/82* (2022.01); *G06V 20/58*
    (2022.01); *B60W 2420/403* (2013.01); *B60W*
     *2554/802* (2020.02); *G06T 2207/20084*
     (2013.01); *G06T 2207/30252* (2013.01)

(56)     References Cited

U.S. PATENT DOCUMENTS

2018/0232909 A1\* 8/2018 Gagnon .................... G06T 7/80
2020/0238991 A1  7/2020 Aragon et al.

\* cited by examiner

SYSTEMS AND METHODS FOR AUTOMATIC CAMERA CALIBRATION

CROSS-REFERENCE TO RELATED APPLICATIONS

The present application is a U.S. National Phase of International Application No. PCT/US2022/070361, entitled "SYSTEMS AND METHODS FOR AUTOMATIC CAMERA CALIBRATION", and filed on Jan. 26, 2022. International Application No. PCT/US2022/070361 claims priority to Indian Provisional Application No. 20/214,1054119, entitled "SYSTEMS AND METHODS FOR AUTOMATIC CAMERA CALIBRATION", and filed on Nov. 24, 2021. The entire contents of each of the above-listed applications are hereby incorporated by reference for all purposes.

FIELD

The disclosure relates to systems and methods for calibrating a camera of a vehicle.

BACKGROUND

Use of advanced driver-assistance systems (ADAS) in modern vehicles has enabled improved vehicle handling and compliance to vehicular laws and regulation. By implementing systems such as sensors and cameras, human errors during vehicle operation may be decreased via generation of alerts, and, in some instances, automated control of the vehicle by the ADAS. As an example, the ADAS may utilize data collected by an in-vehicle device, such as a dashboard camera, e.g., a dashcam, to detect nearby obstacles as viewed through a vehicle's windshield. In some examples, the dashcam may not be permanently installed in the vehicle and thus the position and/or orientation of the dashcam may change if an operator purposely or inadvertently moves the dashcam.

SUMMARY

Methods and systems are provided for calibrating an on-board camera of a vehicle. In one example, a method includes identifying a known vehicle geometry of a lead vehicle; estimating a distance to the lead vehicle based on matching the known vehicle geometry to an image of the known vehicle geometry from the camera; and updating a calibration of the camera based on the estimated distance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
FIG. 1 schematically shows an interior of a cabin of a vehicle including an in-vehicle computing device and a camera.

The embodiments disclosed herein relate to a system-level solution to estimate camera orientation and camera height from the ground plane without the use of any manual calibration process. Conventional manual processes may use a fixed pattern (e.g. painted or drawn testing pattern comprising lines, squares, and other shapes) in front of a camera to resolve the camera height with respect to the ground plane and the camera's orientation. The process described herein includes computer vision and image processing based architecture and methodologies. The embodiments described herein may use aspects of lane detection systems and the computation of vanishing points from 2D and/or 3D images. From the computed information, the orientation angles of the camera in the X, Y, and Z directions (corresponding to pitch, yaw, and roll, respectively) may be resolved. Additionally, the methods described herein may estimate the height of the onboard camera with respect to the ground.

One way to gauge distances of objects using ADAS is through the use of one or more cameras mounted on the vehicle, capable of capturing 2D or 3D imagery. The cameras may use visible light to generate a map of the surroundings to compute how far away other objects are from the vehicle. In order to accurately gauge distances and relative positions of external objects using an ADAS, the camera systems may be calibrated with information regarding the current orientation and position of the camera with respect to the vehicle.

Traditional calibration may involve the use of a fixed pattern (e.g., of light) which may be exposed to the camera. The fixed pattern may be located within a special environment, such as a garage with the pattern painted/drawn on the walls. Calibration within this setting may be manually performed, requiring human intervention to test if the camera is accurately computing its relative position and the depth of objects within the pattern. Manual calibration may require specialized technical knowledge to perform. It is possible that drivers of vehicles equipped with ADAS may not have the special environment needed to calibrate the camera systems accurately or the technical training to calibrate the system themselves. The disclosure described herein attempts to address the issue of calibration technologically using an algorithm to automatically calculate the position and orientation of the camera for the purposes of calibrating the computer vision system of the ADAS. The disclosure described herein may not require the use of a fixed pattern to perform the automatic calibration.

The process described herein may also be implemented to occur automatically and in real-time by the ADAS, instead of requiring manual intervention to be performed, allowing the driver to maintain a desired calibration without additional effort or calibration within a specialized industrial facility. The solution presented herein may be implemented at a system level, meaning that the (possibly limited) computing power afforded to an ADAS-equipped vehicle may be sufficient to perform the calibration calculations. The solution disclosed herein has low computational complexity, requires no technical knowledge on the part of the driver, and requires no specialized environment.

FIG. 1 shows an interior of a cabin 100 of a vehicle 102, in which a driver and/or one or more passengers may be seated. Vehicle 102 may be a road automobile, among other types of vehicles. In particular, vehicle 102 of FIG. 1 may be a motor vehicle including drive wheels (not shown) and an engine. In some examples, the engine may be an internal combustion engine. In other examples, the engine may be an electric engine, or may include hybrid components. For example, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

Vehicle 102 may include a plurality of vehicle systems, including a braking system for providing braking, an engine system for providing motive power to wheels of the vehicle, a steering system for adjusting a direction of the vehicle, a transmission system for controlling a gear selection for the engine, an exhaust system for processing exhaust gases, and the like. Further, the vehicle 102 includes an in-vehicle computing system 109.

As shown, an instrument panel 106 may include various displays and controls accessible to a human user (also referred to as the passenger) of vehicle 102. For example, instrument panel 106 may include a user input device such as a touch screen 108 of an in-vehicle computing system 109, an audio system control panel, and an instrument cluster 110. Touch screen 108 may receive user input to the in-vehicle computing system 109 for controlling audio output, visual display output, user preferences, control parameter selection, etc. In other examples, the instrument panel 106 may further include a display 111 for displaying output to the user, e.g. visual display output and control parameter values. In some examples, instrument panel 106 may include an input device for a user to input one or more controls for driver assistance programs, such as a cruise control system, a collision avoidance system, and the like. Further, additional user interfaces, not shown, may be present in other portions of the vehicle, such as proximate to at least one passenger seat. For example, the vehicle may include a row of back seats with at least one touch screen controlling the in-vehicle computing system 109.

Cabin 100 may also include one or more user objects, such as a camera 160, that are stored in the vehicle before, during, and/or after travelling. The camera 160 may be a visible light and/or depth camera and may be positioned on a dashboard (as shown) or on a windshield of the vehicle. The camera may comprise an image sensor for detecting light, a processor for executing instructions, and memory for storing instructions. The processor and memory of the camera may be responsible for executing the calibration algorithms disclosed herein. The camera 160 may not be permanently installed and an operator of the vehicle may adjust the position of camera 160 when desired. The camera 160 may be connected to the in-vehicle computing system via a communication link. The communication link may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication

[NFC], cellular connectivity, etc.) and configured to provide two-way communication between the camera 160 and the in-vehicle computing system. The camera 160 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link may provide sensor and/or control signals from various vehicle systems (such as vehicle audio system, sensor subsystem, etc.) and the touch screen 108 to the camera 160 and may provide control and/or display signals from the camera 160 to the in-vehicle systems and the touch screen 108. The communication link may also provide power to the camera 160 from an in-vehicle power source in order to charge an internal battery of the camera.

In-vehicle computing system 109 may analyze the input received from the camera 160 and/or other input sources and provide output via touch screen 108 and/or speakers 112, communicate with camera 160, and/or perform other actions based on the assessment. In some embodiments, all or a portion of the assessment may be performed by the camera 160.

Figure 2:
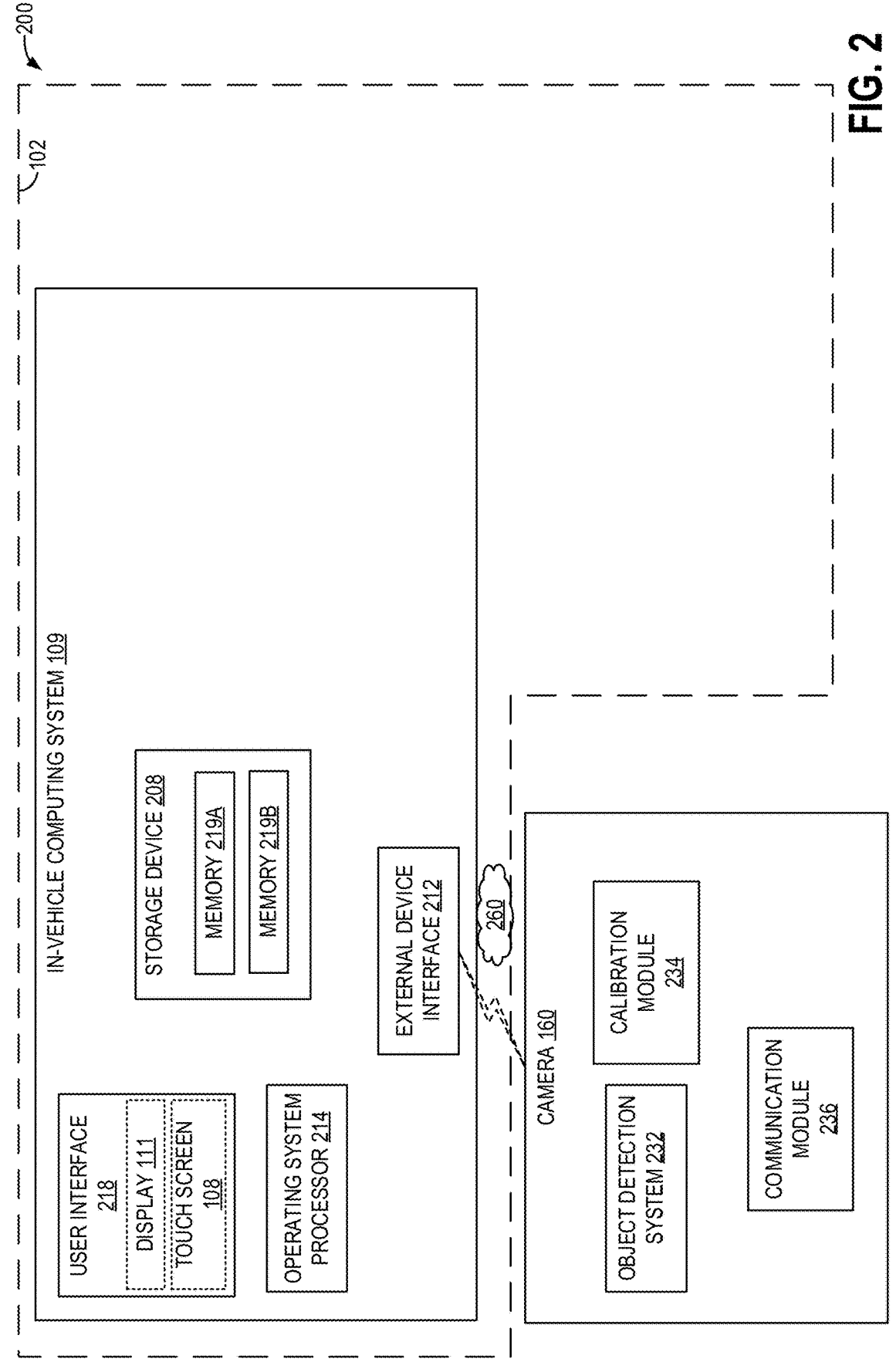
FIG. 2 is a block diagram of the in-vehicle computing system and camera of FIG. 1.

FIG. 2 shows a block diagram 200 of an in-vehicle computing system 109 configured and/or integrated inside vehicle 102. In-vehicle computing system 109 may perform one or more of the methods described herein in some embodiments. The in-vehicle computing system may include, or be coupled to, various vehicle systems, subsystems, hardware components, as well as software applications and systems that are integrated in, or integratable into, vehicle 102 in order to enhance an in-vehicle experience for a driver and/or a passenger.

In-vehicle computing system 109 may include one or more processors including an operating system processor 214. Operating system processor 214 may execute an operating system on the in-vehicle computing system, and control input/output, display, playback, and other operations of the in-vehicle computing system.

A storage device 208 may be included in in-vehicle computing system 109 to store data such as instructions executable by processor 214 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., user interface 218), data stored in volatile memory 219A or non-volatile storage device (e.g., memory) 219B, devices in communication with the in-vehicle computing system (e.g., a mobile device connected via a Bluetooth link), etc. In-vehicle computing system 109 may further include a volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214), controls the in-vehicle computing system 109 to perform one or more of the actions described in the disclosure.

External device interface 212 of in-vehicle computing system 109 may be coupleable to and/or communicate with one or more external devices, such as camera 160. Camera 160 may communicate with in-vehicle computing system 109 either wirelessly or via connectors without departing from the scope of this disclosure. For example, camera 160 may communicate with in-vehicle computing system 109 through the external device interface 212 over network 260, a universal serial bus (USB) connection, a direct wired connection, a direct wireless connection, and/or other communication link. Camera 160 may include a communication module 236 to facilitate communication with in-vehicle computing system 109.

Camera 160 may include an object detection system 232 for detecting objects. For example, object detection system 232 may receive sensor data from an image sensor of camera 160 and may identify objects in the environment surrounding the vehicle, such as traffic lights, other vehicles, pedestrians, and the like. The outputs of object detection system 232 may be used for a variety of systems, such as for notifying a user of an object.

In some examples, object detection system 232 includes a neural network trained on sensor data to detect and identify objects. As one example, object detection system 232 may employ a You Only Look Once (YOLO) as one type of Neural Network Object Detector for detecting and identifying objects via the neural network. In other examples, object detection system 232 may use other object detectors, such as Spatial Pyramid Pooling (SPP), Faster R-CNN (FRCN), Region Proposal Network (RPN), Single Shot Detector (SSD), Deconvolutional Single Shot Detector (DSSD), RetinaNet, Deformable convolution networks, and the like.

While object detection system 232 is shown herein as residing on camera 160, in some examples, object detection system 232 may be included as part of the in-vehicle computing system 109, e.g., as instructions stored in storage device 208. In such examples, images and/or a video feed from camera 160 may be received by the in-vehicle computing system 109 and processed to detect objects, as described above.

Camera 160 further includes a calibration module 234. The calibration module 234 may include instructions stored in memory that are executable by a processor to determine a position and orientation of camera 160 with respect to a road on which the vehicle is traveling. Calibration methods, as described herein, may comprise calculating the orientation of the camera, the height of the camera with respect to the ground, and calculating a region of interest (ROI) within the camera's field of view. The calibration methods disclosed herein may use known geometry (which may depend on the type of vehicle) of a leading vehicle to compute distances within the camera's field of view. Object detection may be used to classify the type of vehicle within the camera's view, e.g. identify whether a vehicle is a sedan, pickup truck, semi-truck, or other type of vehicle. Vehicle classification may be performed, by example, through the use of a trained network which searches for features specific to the various classified vehicle types. Object detection systems may also identify regions within the identified objects, such as the tires or tail lights of a vehicle. The object detection system may, for example, identify the tail lights by their color and ascribe their locations to their geometric centers. The object detection system may also identify tires by the geometric centers of their visible parts. Additional details about calibrating the camera via the calibration module are described below.

Measuring distances between objects in the field of view may be accomplished with the use of known lengths of objects in the scene. In the examples described below, a lead vehicle traveling on a road may be detected in the FOV of the camera and the tail light width of the lead vehicle, the distance between the rear tires of the lead vehicle (track width), and the width of the road may be used to compute distances within the frame and generate an updated calibration of the camera. Geometric constructions using the camera data may be used to estimate the distance between the ADAS-equipped vehicle and the vehicle in front of it. Distance calculations may allow for the construction of a detection region of interest (ROI): a region within the camera's view which may represent objects close to the camera, in addition to computing the camera's height above the ground and the camera's orientation.

Figure 3A:
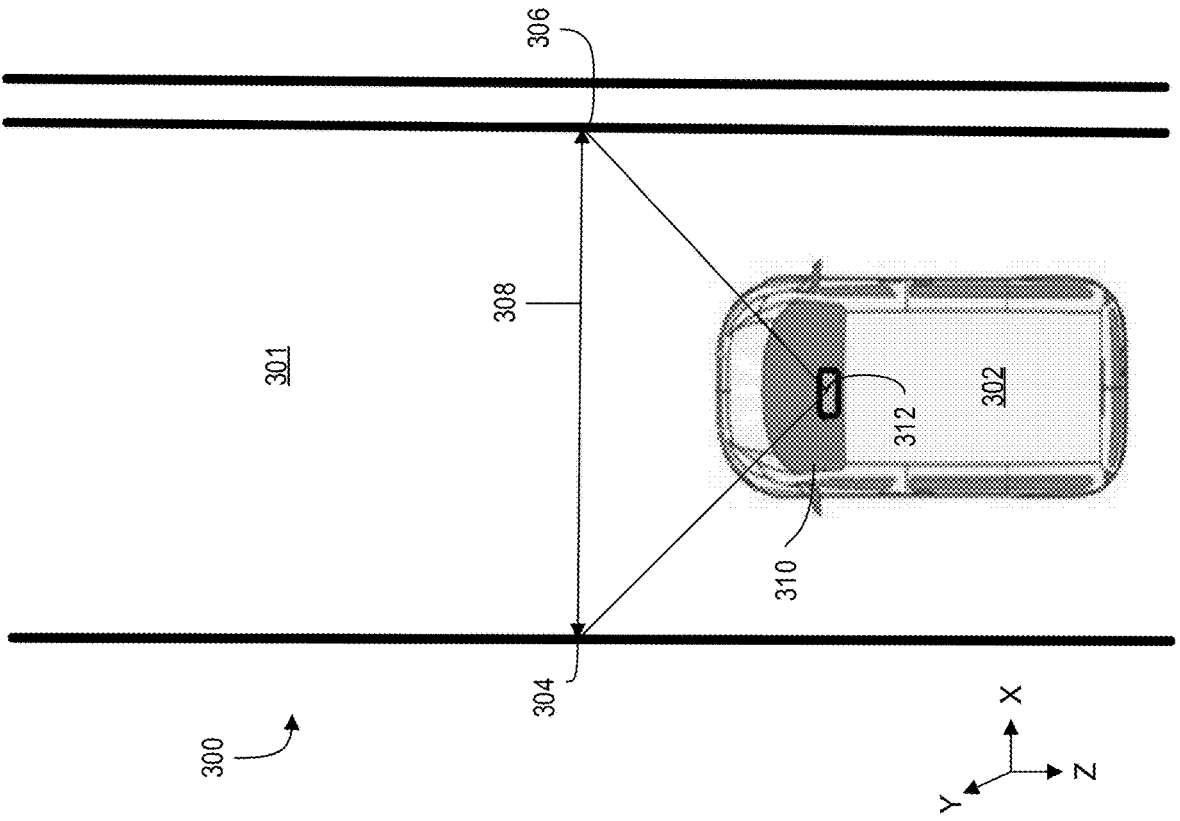
FIG. 3A, FIG. 3B, and FIG. 3C illustrate a calibration process for an in-vehicle camera via birds-eye views of a vehicle on a road.
Figure 3B:
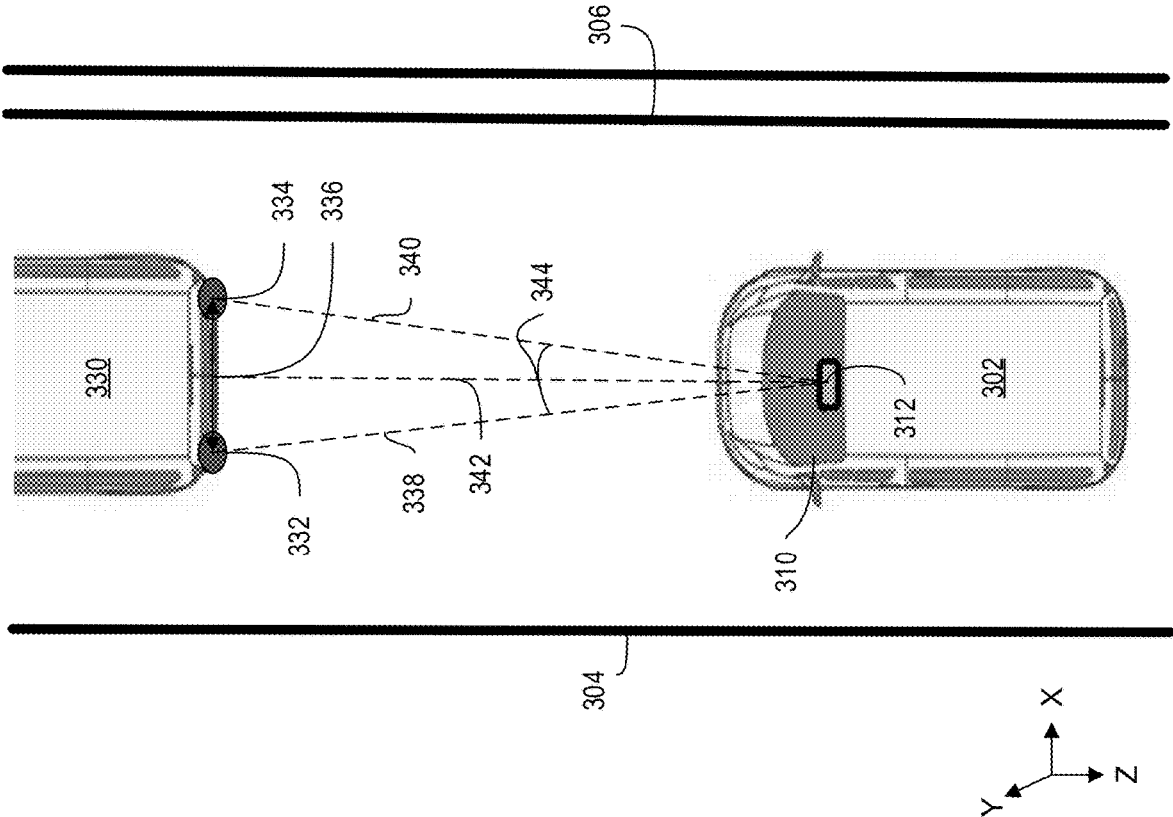
Figure 3C:
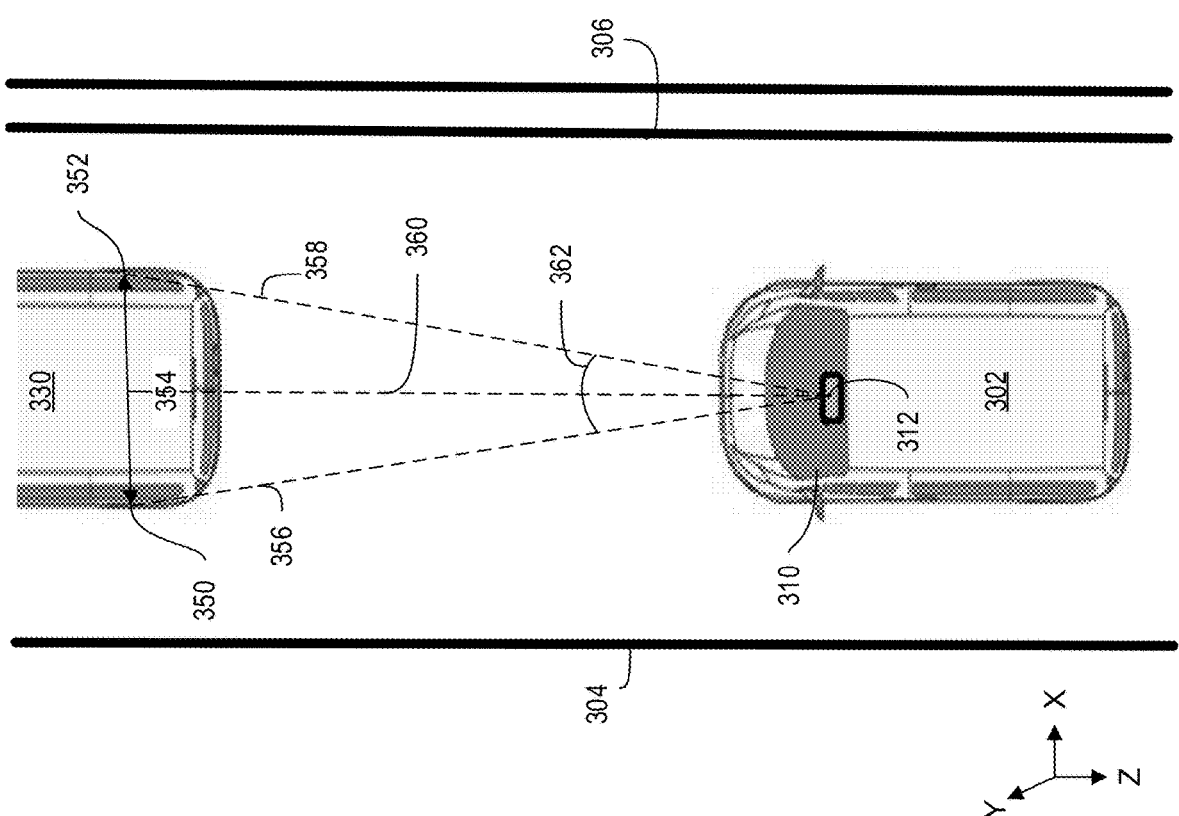

Distance calculations may be performed using the positions of objects within the camera's view and the known geometry of such objects. For example, the known vehicle geometry for a plurality of vehicle types may be used to gauge distances and angles within the scene. FIGS. 3A through 3C show a bird's eye view of a road 300 with an ADAS-equipped vehicle 302 equipped with a camera 312 mounted on the windshield 310. In some examples, the camera may be mounted on the dashboard instead of the windshield. FIGS. 3A-3C feature an XYZ coordinate system, oriented such that positive X is to the right of the camera, positive Y is towards the top of the camera, and positive Z is directly towards the camera. The road 300 may have one or more lanes, such as the lane 301 containing vehicle 302. Camera 312 is a non-limiting example of camera 160 and vehicle 302 is a non-limiting example of vehicle 102.

FIG. 3A shows the road 300 with only vehicle 302. Typically, the width of a road may be regulated by government agencies (e.g. the US department of transportation). For example, a width 308 of the road may be known (e.g. programmed into the memory of the camera or calibration module). The camera 312 may be situated to image the lane 301 as well as a left side line 304 of the lane (e.g. by using computer vision techniques to resolve the lines on the side) and a right side line 306 of the lane. The width 308 (e.g., between the left side line 304 and the right side line 306) may inform the camera of how to perform scale calculations within the scene, in addition to other data described below. The lane detection may also be used to verify that vehicles in front of the ADAS-equipped vehicle 302 are within the same lane (e.g. if a vehicle can be spotted between the left side line 304 and the right side line 306). If vehicles are found within the same lane, their position may be approximated to be directly in front of the ADAS-equipped vehicle.

FIG. 3B shows another bird's eye image of the road 300. In this example, a lead vehicle 330 is in front of vehicle 302. The lead vehicle 330 may be imaged by the camera 312 and a left tail light 332 and a right tail light 334 of the lead vehicle 330 may be identified by the camera 312 (e.g. through the use of computer vision systems). In many countries, a tail light width 336 (e.g. distance between tail lights) may be regulated to within a small margin, possibly allowing the estimated distance to be used as a scale in the visual field of the camera. However, the tail light width may be specific to the classified vehicle type: for example, sedans, semi-trucks, or pickup trucks. Accurate tail light geometry may be obtained by identifying the class of the lead vehicle 330 in front of the camera and comparing the measured geometry to known vehicle geometry. Matching the class of vehicle may be accomplished, for example, via a trained network or machine learning. The trained network may be stored in the camera's memory and used to classify vehicles via instructions executed on the camera's processor.

For example, an image of the lead vehicle 330 (e.g., a rear-view image) may input to a network (e.g. neural network) trained to output a classified vehicle type of the lead vehicle 330. Training data for the trained network may comprise a plurality of images of different classified vehicle types as viewed from behind. The training data may produce a trained network to be stored in (and used by) the camera 312. The trained network may search for features specific to the lead vehicle, such as its height, presence and/or location of rear windows, arrangement of lights, and other information. These features may be used to identify the classified vehicle type of the lead vehicle 330.

Vehicle classification may be inhibited by certain factors, including low light or other poor visibility conditions. The trained network used to evaluate the class of the leading vehicle may output, in addition to the classification result, an uncertainty associated with the identification. If the uncertainty is above a (previously determined) threshold, the vehicle may be classified according to some default value. As a non-limiting example, if the classified vehicle type is not determined within a set uncertainty range, the vehicle may automatically be identified as a sedan.

If the classified vehicle type of the lead vehicle can be accurately identified, the correct tail light width may be selected for the lead vehicle. A computer vision system may be used to identify the locations of the left tail light 332 and the right tail light 334 within the field of view of the camera. The computer vision system may, for example, search for the color of the tail lights and identify the geometric center of each light. The computer vision system may, in some examples, make use of a trained network to find the locations of the tail lights.

The known tail light width 336 may be used to estimate the distance between the vehicle 302 and the lead vehicle 330. The estimated distance between the two vehicles may be used to both generate an ROI and compute the height of the camera with respect to the ground.

In order to estimate distance from the camera 312 to the back of the lead vehicle 330, a series of imaginary lines may be used to create a geometrical construction. For example, an imaginary first line 338 may connect the camera 312 and the left tail light 332. Similarly, an imaginary second line 340 may connect the camera 312 and the right tail light 334. A third line 342 may be drawn from the camera 312 to the midpoint between the left tail light 332 and the right tail light 334. The length of third line 342 may represent the estimated distance between the camera 312 and the center of the tail lights. It should be noted that the imaginary lines shown may not all lie in the XZ plane: the camera 312 may be at a different vertical (Y) level than the tail lights (see FIG. 3D for details). Knowing the vertical level of the tail lights may help compute the height of the camera.

If the locations of the tail lights (e.g. the geometric centers of the tail lights) are successfully identified on the camera, an angle 344 between the tail lights, as seen from the camera, may be resolved (e.g. using the properties of the camera's lens). The angle 344 and the tail light width 336 may be used to resolve the length of the third line 342, which is the estimated distance between the camera 312 and the center of the tail lights. The construction used in FIG. 3B provides one example method for computing distances in the camera's field of view.

FIG. 3C shows a similar technique FIG. 3B, using the apparent positions of the tires of the lead vehicle 330 to calculate distances. The locations of the tires may be identified, for example, by their apparent geometric centers. In this example, the apparent positions of a left tire 350 and a right tire 352 of the lead vehicle 330 may be resolved by the camera 312. The locations of the rear tires may be found, for example, through the use of a trained network or computer imaging system. The locations of the tires may be specified by their apparent geometric centers. Similar to the tail lights, the track width 354 between the tires (below the visible portion of the vehicle) may be standardized for certain classes of vehicles. The classified vehicle type of the lead vehicle (e.g. sedan, pickup truck, semi-truck, etc.) may be resolved through the use of a trained network or machine learning algorithm, as explained above with respect to FIG. 3B.

To estimate the distance between the camera 312 and the lead vehicle 330, three imaginary lines may be drawn in a geometric construction: a first line 356 between the camera 312 and the left tire 350, a second line 358 between the camera 312 and the right tire 352, and a third line 360 between the midpoint of the tires and the camera 312. As in the construction of FIG. 3B, an angle 362 between the first line 356 and the second line 358 may also be calculated using properties of the camera. Given the track width 354 between the left tire 350 and the right tire 352 (and the angle 362 between the tires), the length of the third line 360 (and therefore the distance between the camera 312 and the center of the tires) may be calculated.

Figure 3D:
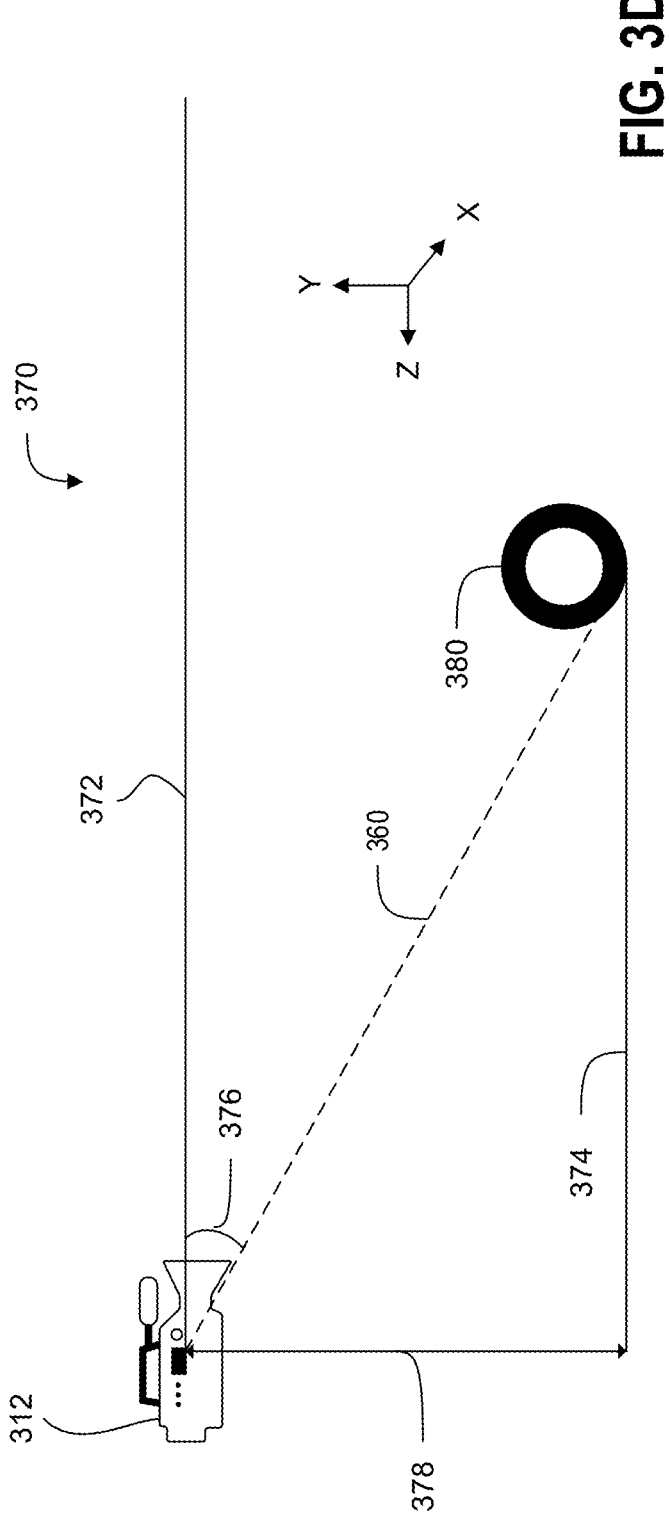
FIG. 3D shows a side-view perspective of the geometric construction in FIG. 3C.

FIG. 3D shows a diagram 370 of a simplified side view of the road 300. In diagram 370, the calibration module of the camera may be used to measure the estimated distance between the camera 312 and a center between the rear tires 380 of the lead vehicle 330. The length of the third line 360 drawn from the camera 312 and the center of the rear tires 380 may be found, for example, using the construction described in FIG. 3C. The calibration module may also be able to resolve a horizon line 372, which may be obtained from measuring the orientation of the camera 312 (see FIG. 5 for more detail). If an angle 376 between the horizon line and the third line 360 between the camera and the tires is known, a height 378 of the camera above the ground can be determined. The diagram 370 may assume that the rear tires 380 are on a ground plane 374. However, if the height of the tail lights is known, a similar procedure may be used to determine the height 378 of the camera 312.

Following the geometric constructions of FIG. 3A through FIG. 3D may give data that can be used to accurately measure distances within the camera's field of view. Data from the tail light spacing (e.g., the tail light width), the track width, and the road spacing (e.g., the lane width) may therefore all be used as factors in generating the updated calibration parameters, such as the updated height of the camera with respect to the ground. The known distances (e.g. the tail light width, the track width, and the width of the lane) may together produce an accurate calibration. Details about the calculation of the camera's orientation (including, but not limited to, the horizon line 372) are given in FIG. 5.

Figure 4:
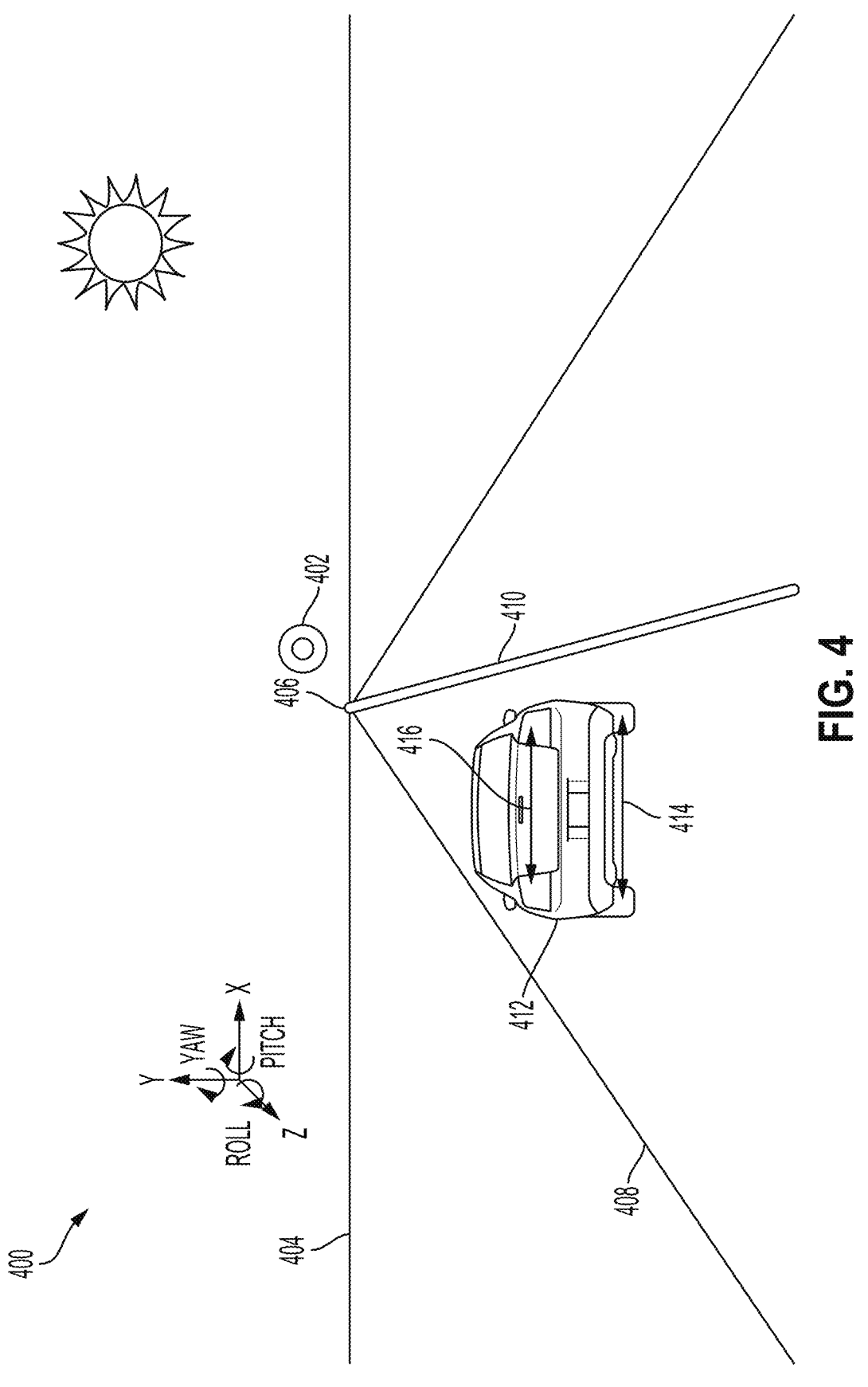
FIG. 4 shows an example image that may be used to calibrate an in-vehicle camera.

FIG. 4 shows a scene 400 with a road and one vehicle 412. The scene 400 is shown as an example viewed from the perspective of the camera affixed to an ADAS-equipped vehicle. The scene shows a horizon 404, which represents the greatest distance visible to the camera. The center of the camera's vision 402 is shown as a circle. The orientation of the camera comprises three angles: the pitch, the roll, and the yaw. The pitch may represent how far forwards or backwards the camera is tipped with respect to the ground plane, the yaw may represent how far left or right the center of the camera is looking with respect to a plane perpendicular to the ground, and the roll may represent the camera's angle with respect an imaginary line extending from the rear of the vehicle to the back. The pitch, yaw, and roll may represent rotations along the X, Y, and Z axes, respectively. From the camera's perspective, parallel lines (such as the sides of the road) stretching into the distance will appear to converge to a single point, herein referred to as the vanishing point 406 of the scene.

The pitch of the camera may be resolved by comparing the y-coordinate of the vanishing point 406 to the y-coordinate of the center of the camera's vision 402. If center of the camera's vision 402 is on the horizon, the pitch may be zero. The pitch of the camera may be used to find the horizon line 372 of FIG. 3D, therefore allowing for the angle 376 between the horizon and the rear tires 380 to be measured. Measurement of the camera's pitch may therefore allow for the height of the camera to be calculated.

The yaw of the camera may be similarly evaluated by comparing the x-coordinate of the center of the camera's vision 402 to the x-coordinate of the vanishing point 406.

The roll of the camera may be given by the apparent angle of the horizon 404 within the field of view. If the horizon 404 appears perfectly flat, the camera has zero roll.

Thus, three measurements may be performed on the scene 400, a tail light width 416 of the vehicle 412, a track width 414 of the vehicle 412, and a width of the lane, bounded by the center line 410 and the side of the road 408. Once the vehicle type of vehicle 412 within the scene is determined, the track width 414 between the rear tires may be identified and other distances may be resolved.

The ROI may be calibrated using both angle and distance information. For example, the size and shape of the ROI may be computed by drawing a detected region on the camera's view corresponding to all points within a certain range of distance and angles.

The ROI may be a fixed portion of the camera's view, representing an area of space directly in front of the ADAS-equipped vehicle. The ROI may be used, for example, to determine that other objects (e.g. vehicles, pedestrians, road hazards, etc.) are in a predefined range of the vehicle. Objects may be detected, for example, when motion is observed within the detection region of interest. In some examples, a default ROI may be drawn within the field of view of the camera. Since the default ROI may not depend on any distance or angle information, it may not accurately reflect when objects are close to the ADAS-equipped vehicle. In some examples, cameras using the default ROI may often give false positive detections of objects that are far away, to the side of the vehicle, or otherwise are not of interest.

Figure 5:
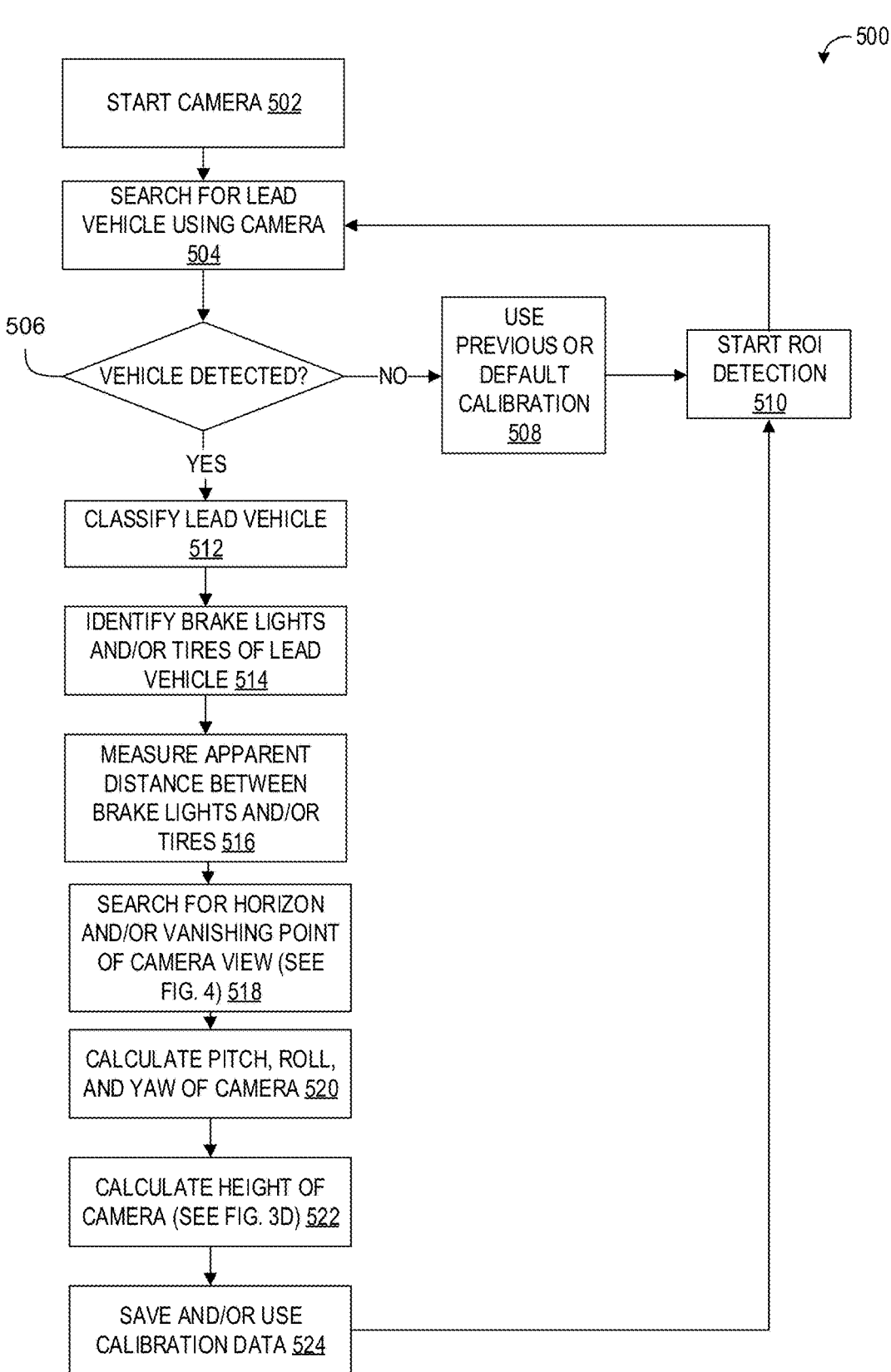
FIG. 5 is a method for calibrating an in-vehicle camera.

FIG. 5 shows a process 500 for calibrating a camera in a vehicle, such as camera 160 of FIGS. 1 and 2. Through process 500, a calibration of the camera may be updated based on estimated distances. Process 500 may be stored in the camera's memory and executed on the camera's processor to generate calibration data. The identifying and estimating of vehicle geometry via process 500 may be performed responsive to every start-up from a shut-down condition of the camera 160. Shut-down conditions may include any time the ADAS-equipped vehicle itself is powered off. Process 500 describes the operation of the calibration module. Calibrating the camera may include determining the position and orientation of the camera, which may change due to operator adjustment of the camera due to the camera not being permanently installed in the vehicle. Process 500 begins with starting the camera at 502. The camera may be started (e.g., powered on) in response to a user input to the camera, such as activation of a power button, and/or in response to the vehicle in which the camera is installed being started. The camera may search for vehicles in the local scene at 504. For example, each image (or each image at some given frequency, such as each ten images) acquired by the camera may be analyzed (e.g., by a trained network) to determine if a vehicle is present in front of the camera. Lane line detection may be used to verify that the detected vehicle is directly in front of the vehicle. At 506, process 500 determines whether or not a vehicle is detected in the lane, which may be referred to as a lead vehicle. The presence of the lead vehicle may be determined, in part, through the use of lane detection: the lead vehicle may be found by searching within the lane on which the vehicle is traveling, where the lane is detected based on the identification of lane lines in the image(s). If no vehicle can be positively identified within the lane, previous calibration data or default calibration data may be used at 508. For example, in response to a lack of a detected lead vehicle within a threshold duration of a start-up of the camera (e.g., within 30 seconds or another suitable amount of time), the default calibration may be utilized. With the calibration data available, ROI detection may start at 510, using the default or previous calibration data. Process 500 returns to 504 to continuously search for vehicles using the camera.

If a lead vehicle is detected at 506, the geometry of the lead vehicle may be resolved. Identifying the known vehicle geometry of the lead vehicle may include classifying the lead vehicle at 512 into one of a plurality of vehicle types (e.g. sedan, pickup truck, or semi-truck). The identification of the vehicle class may be performed, for example, by entering an image of the lead vehicle into a trained model stored in the memory of the camera 160. The trained model may output the correct class of vehicle, for example, through the comparison of the properties of the lead vehicle to the properties of a plurality of training images. The trained network may search for notable features about the lead vehicle, such as its height, the arrangements of its lights, the relative scale of its visible features, and more. For example, once the vehicle class of the lead vehicle is determined (e.g., based on output from a trained network), the vehicle class may be entered into a look-up table stored in memory of the camera, and the look-up table may determine known vehicle geometry, including a known track width, a known tail light width, and/or a height of the tail lights.

The tail lights and/or tires of the lead vehicle are identified at 514. For example, the location of each tail light (e.g., a centermost point of each tail light) and/or a location of each rear tire (e.g., a centermost point of each rear tire) in both the Y and X axes may be identified in a single image acquired by the camera. At 516, the apparent tail light width and/or the measured track width of the lead vehicle is measured. The locations of the rear tires and tail lights may be recorded, allowing the apparent distance (as seen from the camera) to be measured (e.g. using the number of pixels between the objects) at 516. By comparing the apparent tail light width measured at 516 to the known tail light width and the known track width to the measured track width for the given vehicle class, distances in the scene captured by the camera may be resolved, including the distance from the camera to the center of the vehicle's tail lights or the center of the vehicle's rear tires.

At 518, a search for the horizon and/or vanishing point of the camera view may be performed. For example, the horizon and/or vanishing point may be identified in the single image that includes the rear view of the lead vehicle.

The orientation of the camera (e.g. pitch, roll, and yaw) may also be approximated with information in the camera's view at 520. For example, as explained above with respect to FIG. 4, the roll may be computed by the apparent angle of the horizon and the pitch and yaw may be calculated by the angles between the camera's center of vision and the vanishing point. At 522, the updated height of the camera is calculated. Using the orientation of the camera calculated at 520, the apparent distances between the tires and/or tail lights, and geometric constructions, such as those detailed in FIGS. 3A through 3D, the updated height of the camera with respect to the ground may be calculated at 522. The updated height may be calculated, for example, by comparing the apparent angle of the horizon to the apparent angle of the tires.

The calibration data, which may comprise the orientation data collected at 520 and updated height of the camera calculated at 522, may be saved and/or used for updating the calibration data at 524. The calibration data may inform the ADAS system of how to update the ROI, allowing the ROI detection to start at 510 using the calibration data saved at 524. In this way, upon determining the orientation and height of the camera, a detection ROI may be set, where the detection ROI is positioned based on the orientation and height of the camera. The ROI may include a detection region in front of the camera having a size, shape, and orientation determined based on the orientation and height of the camera, such that the detection ROI is always positioned at the same position relative to the vehicle. Upon the detection ROI being set, objects detected by the camera within the detection ROI may trigger an alert to be output notifying the operator of the vehicle that an object has been detected.

In some examples, once the detection ROI has been set, the process ends and a new calibration is not performed until the camera is powered off and then powered back on. However, in other examples, the calibration process may execute periodically, such as once an hour or other suitable frequency, which may enable accurate detection ROIs to be placed in the event an operator inadvertently nudges the camera or the vehicle traverses a bumpy road. In still further examples, the calibration process may be executed periodically as a quality check, and if an initial calibration does not match a subsequent calibration, the calibration may be executed again to ensure the initial calibration is still accurate.

While process 500 is explained herein as initiating calibration in response to detecting a lead vehicle, in some examples the calibration may be initiated in response to detecting lane lines of the road on which the vehicle is traveling, additionally or alternatively to the lead vehicle/vehicle geometry-based calibration. For example, if lane lines are detected but a lead vehicle is not, the camera may be calibrated with the known lane width. Likewise, if a lead vehicle is detected but a lane width cannot be discerned, the camera may be calibrated with the known vehicle geometry of the lead vehicle. If both a lead vehicle is detected and the lane width can be discerned, both the lead vehicle geometry and the lane width may be used to calibrate the camera.

Figure 6:
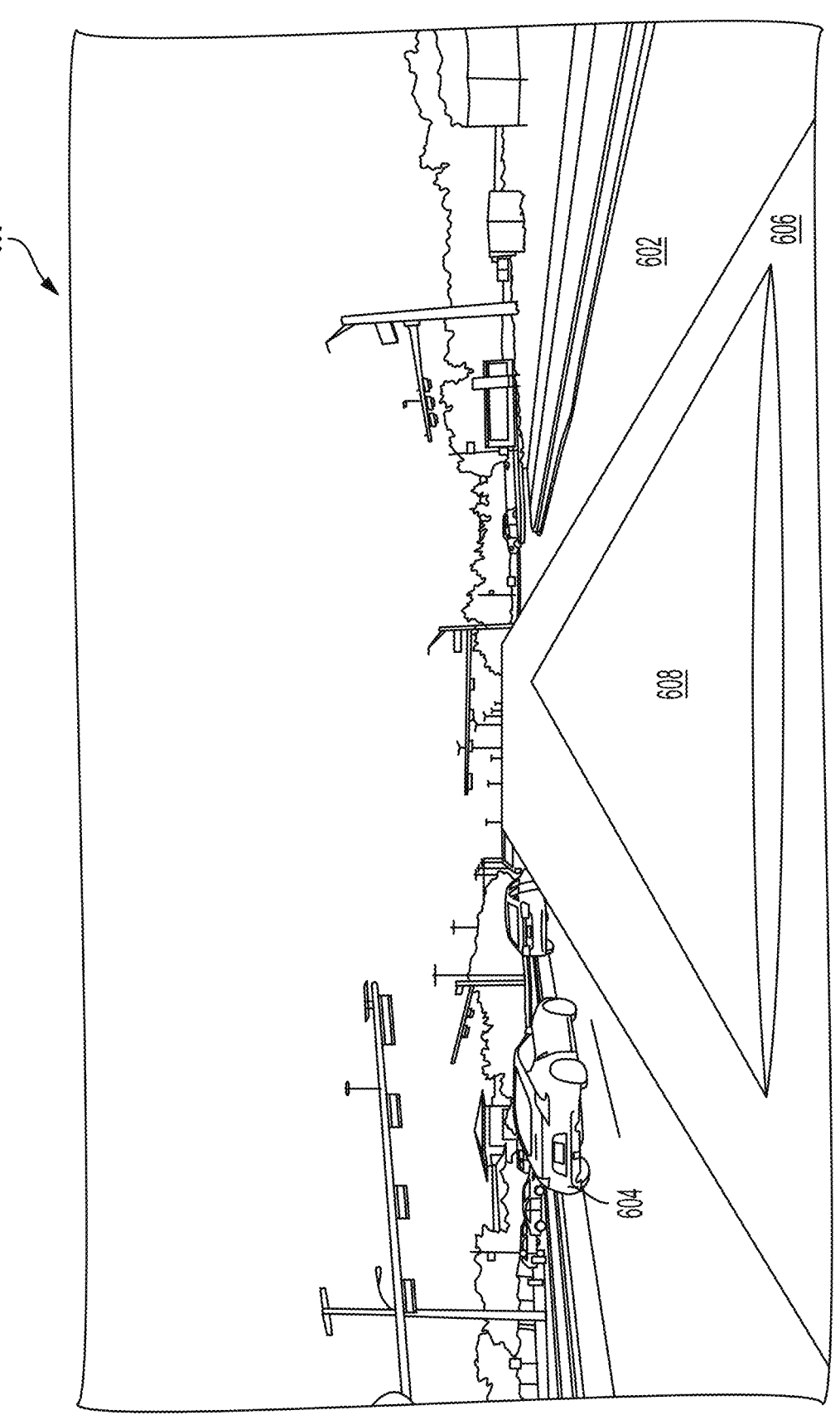
FIG. 6 shows example detection regions of interest (ROIs) for an uncalibrated and calibrated camera.

FIG. 6 shows a photograph 600 from the perspective of a camera mounted within an ADAS-equipped vehicle. The road 602 may have one or more vehicles 604 in the lanes. Region 606 represents the default and uncalibrated region of interest (ROI) as seen from the camera; the default and uncalibrated ROI may represent an area close to the ADAS-equipped vehicle. Detection of objects in the default ROI may allow the ADAS to notify of objects in range of the vehicle (for example, the vehicle operator may receive a notification through the vehicle's sound system). The default and uncalibrated ROI takes up a fixed portion of the camera's view. In the example shown, it may be a region of photograph 600. The default and uncalibrated ROI is large, and objects at the top of the default and uncalibrated ROI may not be very close to the vehicle. Use of the default and uncalibrated ROI may therefore lead to, for example, false positives in the detection of objects.

Calibration data, such as the relative height of the camera over the ground (see FIG. 3D) and/or its orientation (see FIG. 4), may be used to generate (e.g. using process 500) a calibrated ROI 608 based on an updated calibration. The calibrated ROI 608 may represent a smaller region of the screen than the default and uncalibrated ROI and may allow for fewer false positive detections of objects. Further, the calibrated ROI 608 is shifted to the right of the default ROI 606, which is indicative of the camera being positioned left of center of the vehicle. In this way, the calibrated ROI may be positioned at the center of the vehicle, with a smaller depth than the default ROI, which may facilitate detection of only objects in front of the vehicle, particularly at further distances.

A technical effect of calibrating a camera based on detected lane parameters and/or lead vehicle track width and/or height is that the camera may be automatically calibrated without a manual calibration being performed with fixed light patterns, which may allow for accurate on-board calibration during vehicle use.

In another representation, a method for calibrating a camera of a vehicle includes detecting a lead vehicle in an image generated by the camera, classifying the lead vehicle into one of a plurality of vehicle types, measuring a track width of the lead vehicle in the image, comparing the measured track width to a known track width selected based on the classified vehicle type of the lead vehicle, and adjusting a detection region of interest of the camera based on the comparison.

The disclosure also provides support for a method for calibrating a camera mounted in a vehicle, comprising: identifying a known vehicle geometry of a lead vehicle, estimating a distance to the lead vehicle based on matching the known vehicle geometry to an image of the known vehicle geometry from the camera, and updating a calibration of the camera based on the estimated distance. In a first example of the method, the known vehicle geometry is a track width. In a second example of the method, optionally including the first example, the known vehicle geometry is a tail light width. In a third example of the method, optionally including one or both of the first and second examples, identifying the known vehicle geometry of the lead vehicle includes classifying the lead vehicle into one of a plurality of vehicle types. In a fourth example of the method, optionally including one or more or each of the first through third examples, a class of the lead vehicle determines the known vehicle geometry. In a fifth example of the method, optionally including one or more or each of the first through fourth examples, the method further comprises: adjusting a detection region of interest of the camera based on the updated calibration. In a sixth example of the method, optionally including one or more or each of the first through fifth examples, identifying the known vehicle geometry is based on a trained network using images from the camera. In a seventh example of the method, optionally including one or more or each of the first through sixth examples, the method further comprises: determining whether the lead vehicle is present, and in response to lack of a detected lead vehicle within a threshold duration of a start-up of the camera, utilizing a default calibration. In an eighth example of the method, optionally including one or more or each of the first through seventh examples, the identifying and estimating are performed responsive to every start-up from a shut-down condition of the camera.

The disclosure also provides support for a system for calibrating a camera mounted in a vehicle, comprising: an image sensor, a processor, and memory storing instructions executable by the processor to: identify a known vehicle geometry of a lead vehicle, estimate a distance to the lead vehicle based on matching the known vehicle geometry to an image of the known vehicle geometry obtained with the image sensor, and update a calibration of the camera based on the estimated distance. In a first example of the system, updating the calibration of the camera comprises updating a height and/or orientation of the camera based on the estimated distance. In a second example of the system, optionally including the first example, the instructions are further executable to set a detection region of interest based on the updated height and/or orientation of the camera. In a third example of the system, optionally including one or both of the first and second examples, the instructions are further executable to output a notification in response to detecting an object within the detection region of interest. In a fourth example of the system, optionally including one or more or each of the first through third examples, the known vehicle geometry includes a known track width of the lead vehicle, and wherein identifying the known track width of the lead vehicle includes classifying the lead vehicle into one of a plurality of vehicle types and selecting the known track width based on the vehicle class of the lead vehicle. In a fifth example of the system, optionally including one or more or each of the first through fourth examples, classifying the lead vehicle into one of the plurality of vehicle types includes entering the image as input to a trained network stored in the memory.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the camera 160 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, et cetera. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third,"

etc. are used merely as labels, and are not intended to impose numerical requirements or a particular positional order on their objects. The following claims particularly point out subject matter from the above disclosure that is regarded as novel and non-obvious.

The invention claimed is:

1. A method for calibrating a camera mounted in a vehicle, comprising:
   identifying a known vehicle geometry of a lead vehicle;
   estimating a distance to the lead vehicle based on matching the known vehicle geometry to an image of the known vehicle geometry from the camera by:
      measuring an apparent distance between tail lights of the lead vehicle in the image;
      classifying the lead vehicle into a vehicle class of a plurality of vehicle classes by comparing the apparent distance to known vehicle geometries associated with the plurality of vehicle classes;
      selecting the known vehicle geometry using the vehicle class;
      calculating an estimated distance from the camera to a midpoint of tail light geometric centers using a geometric construction of the tail lights in the image and the known vehicle geometry for the vehicle class, wherein the geometric construction comprises identifying the tail light geometric centers based on color detection and resolving an angle between the tail light geometric centers as seen from the camera; and
   updating a calibration of the camera based on the estimated distance, wherein the known vehicle geometry includes a known tail light width.

2. The method of claim 1, wherein the known vehicle geometry is a track width.

3. The method of claim 1, further comprising:
   measuring the apparent distance between rear tires of the lead vehicle in the image;
   classifying the lead vehicle into the vehicle class based on a combination of the apparent distance between the rear tires and the tail lights; and
   calculating the estimated distance from the camera to both a midpoint of the tail light geometric centers and a midpoint of rear tire geometric centers using the geometric construction of the tail lights in the image, a geometric construction of the rear tires in the image, and the known vehicle geometry for the vehicle class by:
      identifying the tail light geometric centers and the rear tire geometric centers based on color detection;
      calculating the angle between imaginary lines extending from the camera to each geometric center; and
      determining the estimated distance based on the angle and the known vehicle geometry; and
   updating the calibration by:
      determining a horizon line in the image;
      calculating a camera height and orientation using the horizon line and estimated distance; and
      adjusting a detection region of interest based on the camera height and orientation.

4. The method of claim 1, further comprising identifying a known lane width of a road on which the vehicle is traveling and calibrating the camera based on the known lane width.

5. The method of claim 1, wherein a class of the lead vehicle determines the known vehicle geometry.

6. The method of claim 1, further comprising adjusting a detection region of interest of the camera based on the updated calibration by:

identifying of a left tail light geometric center and a right tail light geometric center of the tail lights; resolving the angle between the left tail light geometric center and the right tail light geometric center; and using the angle and the known tail light width to calculate the estimated distance between the camera and a midpoint of the left tail light geometric center and the right tail light geometric center.

7. The method of claim 1, wherein identifying the known vehicle geometry is based on a trained network using images from the camera.

8. The method of claim 1, further comprising:

measuring the apparent distance between rear tires of the lead vehicle in the image;

classifying the lead vehicle into the vehicle class based on a combination of the apparent distance between the rear tires and the tail lights; and calculating the estimated distance from the camera to both a midpoint of the tail light geometric centers and a midpoint of rear tire geometric centers using the geometric construction.

9. The method of claim 1, further comprising:

updating the calibration by:

determining a horizon line in the image;

calculating a camera height and orientation using the horizon line and estimated distance; and adjusting a detection region of interest based on the camera height and orientation.

10. A system for calibrating a camera mounted in a vehicle, comprising:

an image sensor;

a processor; and memory storing instructions executable by the processor to:

identify a known vehicle geometry of a lead vehicle;

identify a known lane width on a road on which the vehicle is travelling;

estimate a distance to the lead vehicle based on matching the known vehicle geometry to an image of the known vehicle geometry obtained with the image sensor by measuring an apparent distance between features of the lead vehicle and comparing the apparent distance to known vehicle geometries to classify the lead vehicle; and update a calibration of the camera based on one or both of the estimated distance and the known lane width, wherein the features include one or both of tail lights and rear tires of the lead vehicle.

11. The system of claim 10, wherein updating the calibration of the camera comprises updating a height and/or orientation of the camera based on one or both of the estimated distance and the known lane width.

12. The system of claim 11, wherein the instructions are further executable to set a detection region of interest based on the updated height and/or orientation of the camera and to output a notification in response to detecting an object within the detection region of interest.

13. The system of claim 10, wherein the instructions are further executable to estimate the distance to the lead vehicle by:

measuring an apparent distance between tail lights of the lead vehicle in the image;

classifying the lead vehicle into a vehicle class of a plurality of vehicle classes by comparing the apparent distance to known vehicle geometries associated with the plurality of vehicle classes;

selecting the known vehicle geometry using the vehicle class; and calculating the estimated distance from the camera to a midpoint of tail light geometric centers using a geometric construction of the tail lights in the image and the known vehicle geometry for the vehicle class.

14. The system of claim 10, wherein the known vehicle geometry includes a known track width of the lead vehicle, and wherein identifying the known track width of the lead vehicle includes classifying the lead vehicle into one of a plurality of vehicle types and selecting the known track width based on the classification of the lead vehicle.

15. The system of claim 14, wherein classifying the lead vehicle into one of the plurality of vehicle types includes entering the image as input to a trained network stored in the memory.

* * * * *